United States Patent
Lawless, III et al.

(10) Patent No.: US 10,814,540 B2
(45) Date of Patent: Oct. 27, 2020

(54) METHOD FOR EVENLY DISTRIBUTING PLASTIC MELT IN A HOT RUNNER SYSTEM USING STRAIN GAUGES

(71) Applicant: IMFLUX INC., Hamilton, OH (US)

(72) Inventors: William Francis Lawless, III, Medford, MA (US); Rick Alan Pollard, Moscow, OH (US); Gene Michael Altonen, West Chester, OH (US); Brian Matthew Burns, Mason, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 16/708,628

(22) Filed: Dec. 10, 2019

(65) Prior Publication Data

US 2020/0108538 A1 Apr. 9, 2020

Related U.S. Application Data

(62) Division of application No. 15/616,240, filed on Jun. 7, 2017, now Pat. No. 10,538,023.

(Continued)

(51) Int. Cl.
*B29C 45/78* (2006.01)
*B29C 45/77* (2006.01)
(Continued)

(52) U.S. Cl.
CPC .......... *B29C 45/78* (2013.01); *B29C 45/1782* (2013.01); *B29C 45/2737* (2013.01);
(Continued)

(58) Field of Classification Search
CPC ................................ B29C 45/77; B29C 45/78
See application file for complete search history.

(56) References Cited

U.S. PATENT DOCUMENTS 4,429,579 A 2/1984 Wilhelm
5,472,331 A 12/1995 Watkins
(Continued)

FOREIGN PATENT DOCUMENTS

DE 102009014311 A1 2/2010
JP H0890622 A 4/1996
JP H08244086 A 9/1996

OTHER PUBLICATIONS

Invitation to Pay Additional Fees and, Where Applicable, Protest Fee, International Application No. PCT/US2017/036327, dated Aug. 18, 2017.

(Continued)

*Primary Examiner* — Timothy Kennedy
*Assistant Examiner* — George W. Brady
(74) *Attorney, Agent, or Firm* — Marshall, Gerstein & Borun LLP

(57) ABSTRACT

A hot runner injection molding apparatus, and method of use, is disclosed in which strain gauges are provided in the temperature zones of the hot runner injection molding apparatus and a hot runner controller creates a target strain profile, detects deviations from the target strain profile in any temperature zone based on the strain readings provided by the strain gauges in each temperature zone, and instructs correction of deviations from the target strain profile in any deviating temperature zone by adjusting the heat produced by a heater or heaters in the deviating temperature zone. The target strain profile may be based on a median or average of strain readings provided over time by the strain gauges in each temperature zone. A hollow installation tube for placing the strain gauges in the hot runner injection molding apparatus is also disclosed.

7 Claims, 9 Drawing Sheets

Related U.S. Application Data

(60) Provisional application No. 62/356,648, filed on Jun. 30, 2016.

(51) Int. Cl.
*B29C 45/17* (2006.01)
*B29C 45/27* (2006.01)

(52) U.S. Cl.
CPC .......... *B29C 45/77* (2013.01); *B29C 45/2738* (2013.01); *B29C 2945/76103* (2013.01); *B29C 2945/76274* (2013.01); *B29C 2945/76481* (2013.01); *B29C 2945/76531* (2013.01); *B29C 2945/76745* (2013.01); *B29C 2945/76752* (2013.01); *B29C 2945/76759* (2013.01)

(56) References Cited

U.S. PATENT DOCUMENTS

| | | |
|---|---|---|
| 6,090,318 A | 7/2000 | Bader et al. |
| 2012/0217668 A1 | 8/2012 | Catoen et al. |

OTHER PUBLICATIONS

International Application No. PCT/US2017/036327, International Search Report and Written Opinion, dated Nov. 13, 2017.

METHOD FOR EVENLY DISTRIBUTING PLASTIC MELT IN A HOT RUNNER SYSTEM USING STRAIN GAUGES

CROSS-REFERENCE TO RELATED APPLICATIONS

This application is a divisional of U.S. patent application Ser. No. 15/616,240, filed Jun. 7, 2017, claims the benefit of the filing date under USC § 119(e) of, U.S. Provisional Appl. No. 62/356,648, filed Jun. 30, 2019, which are hereby incorporated by reference in their entirety.

FIELD OF THE DISCLOSURE

This application relates generally to injection molding and, more specifically, to a method of automatically balancing a hot runner system in an injection molding process using strain gauge values for a particular manifold, cavity nozzle, or temperature control zone either on the surface of the hot runner manifold, on the surface of the hot runner nozzle, or on the outer surface of the mold, to correspond to an apparent melt pressure. In particular, this application relates to identifying the difference in apparent melt pressure for each manifold, cavity or hot runner temperature zone during an injection molding process using parameters sensed by at least one strain gauge and changing heat produced by heaters in that temperature zone to equally balance the flow of molten plastic.

BACKGROUND

At the start of an injection molding process, thermoplastic pellets are fed by a hopper into a heated barrel and driven to the end of the heated barrel by a reciprocating screw. The thermoplastic pellets melt into a molten thermoplastic material, and shots of thermoplastic material are injected through a nozzle. The molten thermoplastic material then flows through either a cold runner or a hot runner to the gates of each individual cavity of a mold. After entering the gate, the molten thermoplastic material fills a mold cavity formed between two or more sides of the mold held together under pressure by a press or clamping unit. Once the shot of molten thermoplastic material is injected into the mold cavity, the reciprocating screw stops traveling forward. The molten thermoplastic material takes the form of the mold cavity and cools inside the mold until it solidifies. Then the clamping unit releases the mold sides and the finished part is ejected from the mold.

The injection molding process may incorporate molds which manufacture multiple parts for each representative cycle, each of the multiple parts being formed in a distinct mold cavity. The mold may be identified by the number of parts that it manufactures in each cycle. For example, if a mold manufactures eight parts at a time, it is referred to as an eight-cavity mold. The runner system of a mold includes channels which deliver plastic to each individual cavity. A runner system is referred to a cold runner system or a hot runner system.

Whatever the particular cavitation of a mold, or type of runner system, distributing the molten plastic evenly to each individual cavity is desirable in order to prevent some cavities from filling too soon or too late, or at too high a pressure or too low a pressure, as this would have a potential effect on the quality for the parts produced. Specifically, the flow of plastic to a particular cavity could occur before or after the overall average fill time of the group, resulting in inconsistent quality of parts. For example, if cavity 1 fills first or at a higher pressure, followed by cavities 2-7 filling simultaneously or at median pressure, followed by cavity 8 filling lastly or at a lower pressure, the part formed in cavity 1 may have a defect known as flash or may be heavier or dimensionally larger part than the parts produced in cavities 2-8. Likewise, the part formed in cavity 8 may have a defect known as a short-fill or may be a lighter or dimensionally smaller part than the parts produced in cavities 1-7.

A cold runner system is a method of delivering plastic to each cavity of a mold in which plastic cools and solidifies into the shape of the desired part as defined by the mold cavity and into the shape of the channels that were designed to distribute the plastic melt to each mold cavity. The cold runner system is geometrically designed to account for the flow lengths and pressure drops to each gate location for each mold cavity in order to balance the fill of each mold cavity as equally as possible. However, the plastic from the runner system needs to be discarded as either scrap or needs to go through an additional process of being recycled (regrind) and re-introduced to the molding process at another time. This adds an overall increase in cost to produce any given plastic part using a cold runner system.

A hot runner system, similar to a cold runner system, is geometrically designed to account for the flow lengths and pressure drops to each gate location for each mold cavity. In addition, hot runners are thermally designed with heating zones which may be controlled with a heater and thermocouple combination to keep the plastic within its channels molten so that it may be used immediately for the next cycle. This eliminates the scrap and regrind that are associated with a cold runner system. Although hot runners are geometrically and thermally designed to distribute the flow of plastic evenly to each cavity of the mold, the effects of differential of heat transfer throughout the hot runner system as well as variation of melt due to laminar flow effects often necessitate changing temperatures in the hot runner system through trial and error. The change in temperatures is routinely accomplished using an output such as part weight or part dimension to determine which zones need to be changed in order to achieve optimal balance of fill to each cavity.

Ideally, sensors for monitoring an injection molding process would be indirect, easy to install, and inexpensive. Direct sensors, such as sensors placed within a mold cavity, leave undesirable marks on part surfaces. For example, while demand for injection molded parts with high gloss finishes has been increasing, direct sensors positioned in the mold cavity have a tendency to mar the high gloss finish of the parts, requiring post-molding operations to machine or otherwise mask or remove the marred regions from the parts. As a result, indirect sensors that are not located in the mold cavity are preferable. Additionally, when the molding system is being used to make products for medical applications, contact between a sensor and the thermoplastic material may be prohibited.

More recently, strain gauges have been placed on a mold surface, within a nozzle adapter, or elsewhere within an injection molding apparatus, in order to measure how strain at the measured location changes over the course of a standard injection molding process. For example, a strain gauge sensor placed on the exterior of the mold surface adjacent to a parting line of a mold, as described in co-owned U.S. Patent Application No. 62/303,654, "External Sensor Kit for Injection Molding Apparatus and Methods of Use," the entirety of which is hereby incorporated by reference, is able to sense the surface strain changes on the mold surface that occur over time as a result of the closing and opening forces. In response to surface strain changes, the strain gauge sensor emits an electrical signal, typically in the range of −10 to 10 Volts. The signal emitted by the strain gauge sensor is received and used by a controller to approximate one or more conditions within the mold, such as the pressure within the mold cavity or the location of the melt flow front. In certain molds in which the ratio of the length of the flow channel to the thickness of the molded part is great, i.e. molds having a high length-to-thickness (L/t) ratio, the pressure at the melt flow front may be approximated based on the signals emitted by the strain gauge sensor(s).

SUMMARY

Embodiments within the scope of the present disclosure are directed to methods of thermally balancing a hot runner system of an injection molding process using sensed parameters provided by an external sensor. Strain gauge sensors are the type of sensor primarily discussed, while other sensors capable of detecting movement of steel as a proxy or tell-tale for internal conditions such as melt pressure, could achieve the same purpose as a strain gauge sensor and are within the scope of the present disclosure. For example, microwave sensor kits, x-ray sensor kits, ultrasonic sensor kits, air pressure sensor kits, air temperature sensor kits, and sub-surface temperature sensor kits, could all be substituted for the strain gauge sensors described and depicted below. Additionally, other types of external gauge sensors, such as electrical, electronic, mechanical, wireless, and fiber optic sensors, could be utilized instead of strain gauge sensors. Strain gauge sensors located on mold surfaces, hot runner manifold surfaces, and hot runner nozzle surfaces are primarily discussed below, while strain gauge sensors located in other locations within an injection molding apparatus could achieve the same purposes.

Throughout an injection molding process, the hot runner system and the outer steel plates of the mold experience changes in strain. The strain experienced by a hot runner system or the outer steel plates of a mold may differ depending on what type of injection molding process is being used. Strain gauges or pins located on mold surfaces, hot runner manifold surfaces, or hot runner nozzle surfaces are able to sense changes in strain and provide strain change data to a controller. The controller may contain a strain profile that has been developed to identify target strain values and times to reach the target strain values. The target strain profile can be compared to sensed strain values over time for each quadrant, nozzle cavity, or hot runner temperature zone during an injection molding process. The target strain profile may be based on a median or average value of strain value over time for all of the cavities being compared.

Hot runner temperature zones can be balanced by changing the temperature set point for a particular zone that exhibits a strain profile that occurs sooner or later, or exhibits a greater or lesser change in strain, than the target strain profile indicates should be the case. For example, if a first cavity in an eight cavity mold experiences a peak strain prior to the time when the target strain profile suggests the peak strain should be experienced but the other seven cavities are following the target strain profile, plastic is flowing more easily into the first cavity than into the second through eighth cavities. The controller can identify this deviation from the target strain profile using an algorithm, can determine whether the deviation from the target strain profile exceeds an acceptable deviation limit, and can, if necessary, calculate how much the temperature in the temperature zone for the first cavity should be decreased in order to correct the deviation. The controller can then, via a connector and thermocouple, reduce the heat being generated by the heaters in the temperature zone for the first cavity accordingly.

Strain gauges or pins that are installed on a hot runner manifold or hot runner nozzle are potentially more accurate than using a strain gauge installed on the outer surfaces of the steel plates on the outside of the mold. However, the cost in installation or removal could be in systems in which the mold plates have to be disassembled in order to access the strain gauges/pins for installation or removal. To avoid this increase in cost, component assemblies for hot runner injection molding systems may be designed to allow for the installation and removal of strain gauges/pins without disassembly and reassembly of the mold plates. For example, a strain gauge installation tube may be used to allow for both the protection and insulation of the strain gauge or pin cable. The strain gauge installation tube may also act as an extension tool in order to install the strain gauge/pin to the specified torque, as well as loosen and remove the strain gauge/pin without disassembly or reassembly of the mold plates. Likewise, the hot runner nozzle may be design to include an area of steel which would be offset so that installation or removal of a strain gauge/pin could be performed without disassembly or reassembly of the mold plates.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

Figure 1:
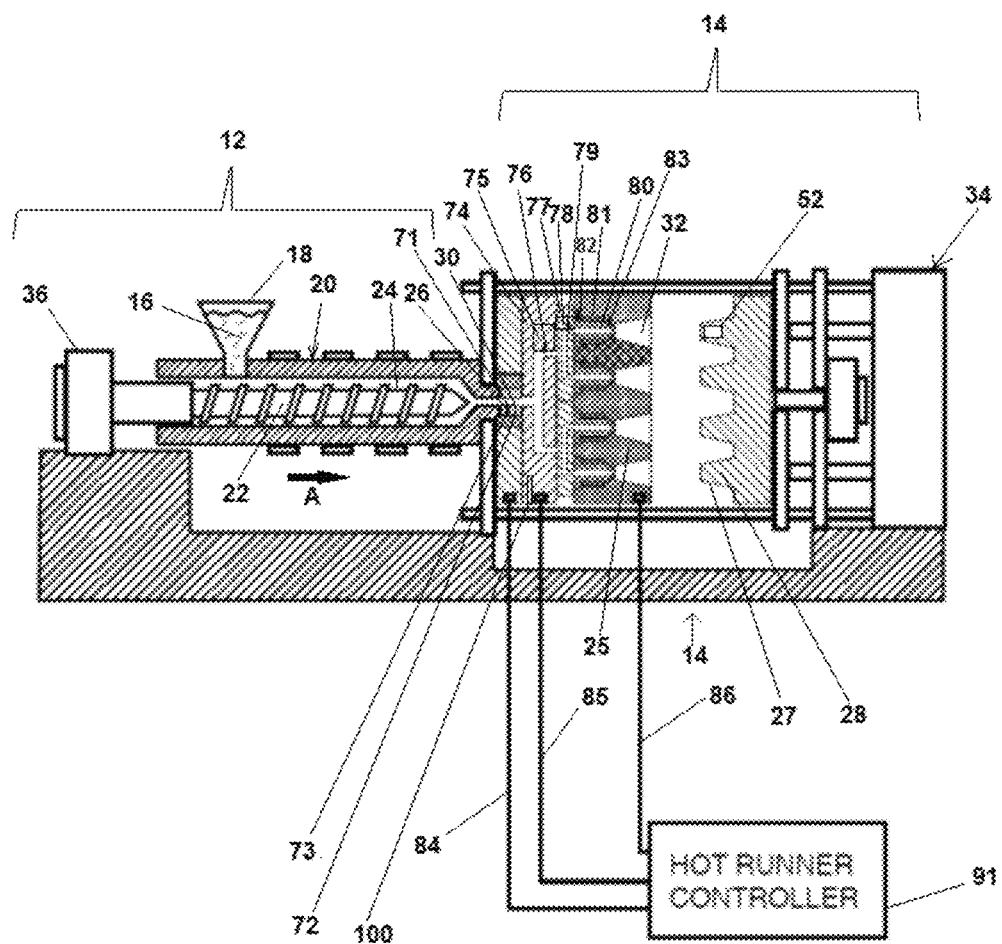
FIG. 1 illustrates, semi-schematically, a conventional injection molding apparatus, wherein a hot runner system comprised of a hot runner manifold system with hot runner nozzles leading to mold cavities formed by mold plates is equipped with strain gauges/pins on either the hot runner manifolds, the hot runner nozzles, the outer surface of the mold plates, or a combination thereof.

Referring to the figures in detail, FIG. 1 illustrates an exemplary injection molding apparatus 10 for producing thermoplastic parts in high volumes (e.g., a class 101 injection mold, or an "ultra-high productivity mold", a class 102 (medium-to-high productivity mold), or class 103 (a medium productivity mold)). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a ram, such as a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24 toward a nozzle 26 to form a shot of thermoplastic material, which will be injected into a sprue or inlet 71. The temperature of inlet 71 is maintained by an inlet heater 72 and inlet thermocouple 73. The molten material 24 flows through crossover manifold 74, which is maintained at a desired temperature by crossover heater 75 and crossover thermocouple 75. The molten material 24 then flows to one or more manifolds 77 maintained at a desired temperature by a manifold heater 78 and a manifold thermocouple 79. The molten material 24 then flows to one or more hot runner nozzles 80 maintained at a desired temperature by a nozzle heater 81 and a nozzle thermocouple 82. The molten thermoplastic material 24 may be injected through a gate 30, which directs the flow of the molten thermoplastic material 24 to the mold cavity 32. The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. In a typical high variable pressure injection molding machine, the press typically exerts 30,000 psi or more because the clamping force is directly related to injection pressure. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. The latter may be considered a family of mold cavities 32.

The embodiment depicted in FIG. 1 depicts three separate locations that strain gauges are located. A strain gauge 100 is provided in the hot runner manifold 77, a strain gauge 52 is provided on the exterior of the mold 28, and a strain gauge 83 is provided in a hot runner nozzle 80. Additional detail is provided in FIGS. 1A and 1B regarding placement of strain gauges 100 and 83. Strain gauge 52 may be placed on the exterior of the mold directly or using a coupon, as described in co-owned U.S. Patent Application No. 62/303,654, "External Sensor Kit for Injection Molding Apparatus and Methods of Use," incorporated herein by reference. The strain gauges 100, 52, and 83 are in communication with a hot runner controller 91 via strain gauge connector 86. Strain gauges 100, 52, and 83 may be strain pins or any type of strain measuring mechanism. In some embodiments within the scope of the present disclosure, only one or two of strain gauges 100, 52, and 83 are provided.

The hot runner controller 91 is in communication with inlet thermocouple 73, crossover thermocouple 76, manifold thermocouple 79, and nozzle thermocouple 82 via thermocouple connector 85. The hot runner controller 91 is in further communication with inlet heater 72, crossover heater 75, manifold heater 78, and nozzle heater 81 via heater connector 84. The temperature of each heating zone is maintained at a set point by an algorithm, which determines if the thermocouple reading of measured temperature taken by thermocouple 76, 79, or 82 matches a set point value for the corresponding zone.

The hot runner controller 91 maintains a balance in temperature throughout the hot runner manifold 77 to prevent defects in the parts made in mold cavities 32. To achieve this end, the strain gauge values communicated by the strain gauge connector 86 are compared to a target strain profile for the set point temperature of the manifold heater 78 or nozzle heater 81, and the temperature produced by the manifold heater 78 or the nozzle heater 81 may be increased or decreased depending on what is necessary to correct any impermissible deviation from the target strain profile. The target strain profile may be predetermined. The predetermined target strain profile may be based upon historical strain process information, such a historical median or average of strain value over time for all of the cavities being filled. Alternately, the target strain profile may be determined as an injection molding process is occurring based upon the median or average value of strain value over time for all of the cavities being filled. The hot runner controller 91 may include a microprocessor (or another suitable processing unit, or several such units), a non-transitory memory, and one or more communication links.

Figure 1A:
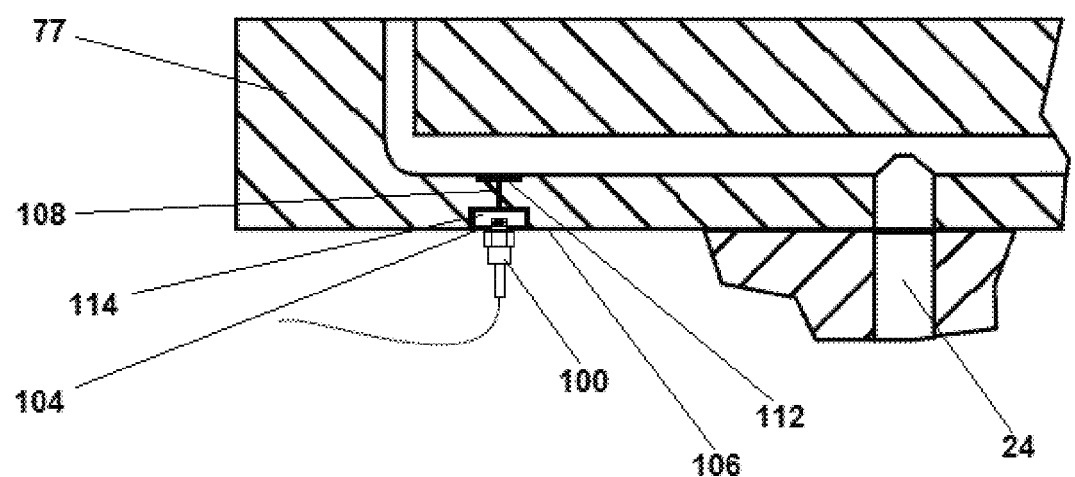
FIG. 1A illustrates an enlarged cross-sectional view of the strain pin installed on the hot runner manifold depicted in FIG. 1.

In FIG. 1A, an enlarged cross-sectional view of the manifold 77 shows the path of molten thermoplastic material 24. A strain gauge aperture 104 is provided in an external wall 106 of the manifold 77 to accommodate strain gauge 100. In some embodiments, the longitudinal axis of strain gauge aperture 104 is perpendicular to the axis of the melt flow conduit 102. A minimum distance 108 must be maintained between the bottom 110 of the strain gauge aperture 104 and an internal melt flow conduit wall 112 to avoid cracking or leaking through the internal melt flow conduit wall 112. In some embodiments within the scope of the present disclosure, the minimum distance 108 is 0.5 mm.

In some embodiments within the scope of the present disclosure, the strain gauge aperture 104 may be formed in an alternative material insert 114 that is made of a different material than the rest of the hot runner manifold 77. In some embodiments, the hot runner manifold 77 is made from stainless, pre-treated steel while the alternative material insert 114 is made from aluminum, brass, titanium, thermoset plastic, composite, and steel with a lower flex modulus than base steel or a combination of two or more of these materials. steel with a lower flex modulus than base steel, or another material that will better amplify the strain for detecting by the strain gauge pin 83. The alternative material insert 114 may have a lower flex modulus than the material of the rest of the hot runner manifold 77. In some embodiments, the alternative metal insert is formed from a modified metallurgy that expands at the same rate as steel. The minimum distance 108 may vary depending upon the material forming the alternative material insert 114.

Figure 1B:
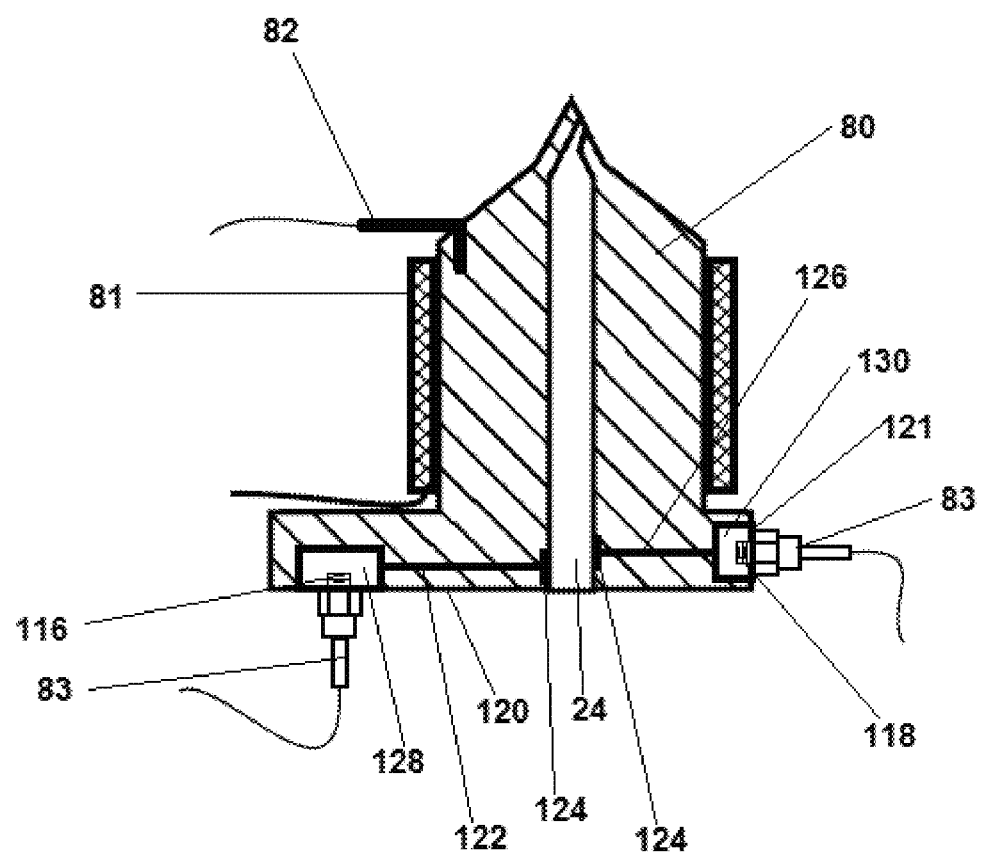
FIG. 1B illustrates an enlarged cross-sectional view of the strain pin installed on the hot runner nozzle depicted in FIG. 1.

In FIG. 1B, an enlarged cross-sectional view of a hot runner nozzle 80 shows the path of molten thermoplastic material 24 through the hot runner nozzle 80. A cylindrical nozzle heater 81 is provided around the hot runner nozzle 80 and a nozzle thermocouple 82 is provided near the cylindrical nozzle heater 81. Two strain gauges 83 are provided in strain gauge apertures 116 and 118 respectively on external walls 120 and 121 respectively. Minimum distance 122 must be maintained between the side of strain gauge aperture 116 and an internal melt flow conduit wall 124, and minimum distance 126 must be maintained between the bottom of strain gauge aperture 118 and the internal melt flow conduit wall 124 to avoid cracking or leaking through the internal melt flow conduit wall 124. In some embodiments within the scope of the present disclosure, the minimum distance 108 is 0.5 mm.

In some embodiments within the scope of the present disclosure, the strain gauge apertures 116 and 118 may be formed in an alternative material inserts 128 and 130 respectively. The alternative material inserts 128 and 130 are made from a different material than the rest of the hot runner nozzle 80. The alternative material inserts 128 and 130 may be made from the same or a different material from one another. The alternative material inserts 128 and 130 may have a lower flex modulus than the material of the rest of the hot runner nozzle 80. In some embodiments, the hot runner nozzle 80 is made from stainless, pre-treated steel while the alternative material inserts 128 and 130 are made from one of aluminum, brass, titanium, thermoset plastic, composite, and steel with a lower flex modulus than base steel or a combination of two or more of these materials. that will better amplify the strain for detecting by the strain gauge pins 83. In some embodiments, the alternative metal insert is formed from a modified metallurgy that expands at the same rate as steel. The minimum distances 122 and 126 may vary depending upon the material forming the alternative material insert 114.

Figure 2:
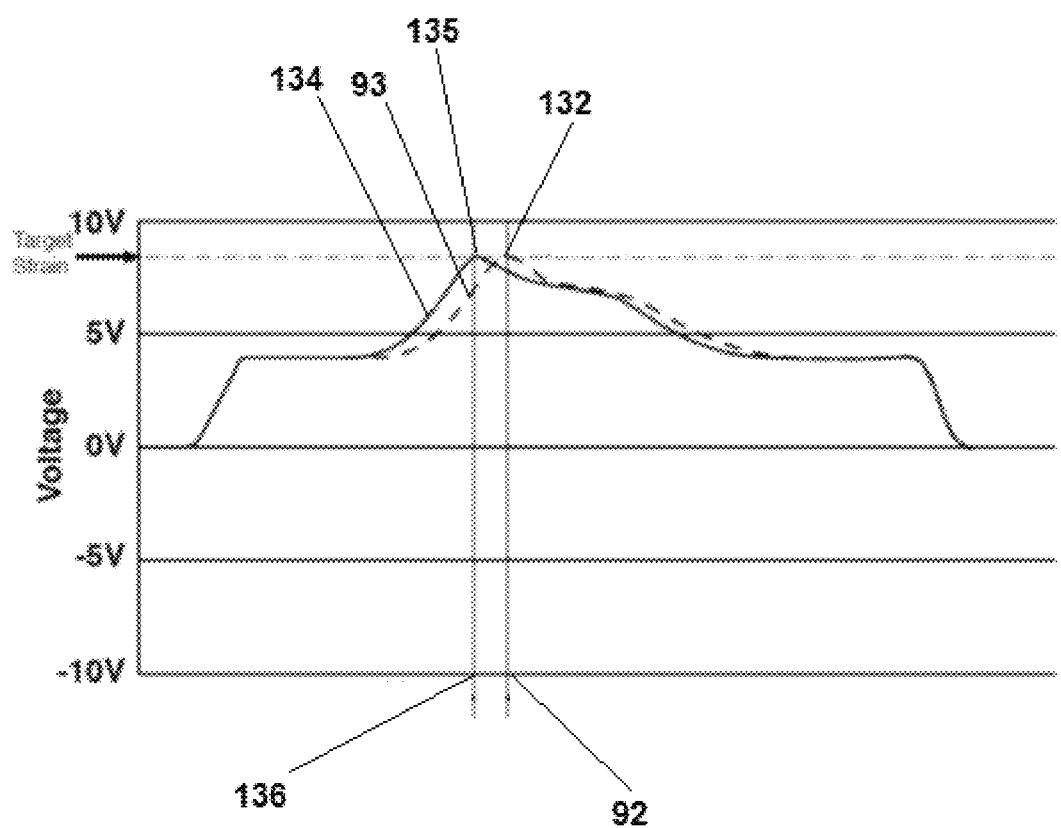
FIG. 2 illustrates an exemplary target strain profile for the displaying the comparison of median strain value target and median target time to reach strain value target for cavities 1-8.

FIG. 2 illustrates an exemplary comparison of the target strain profile 93 for a molding cycle of an eight-cavity mold. A target peak strain 132 is identified on the target strain profile 93 at target peak strain time 92. The target strain profile 93 represents the median of strain readings obtained by strain gauges 52, 100, or 83, or a combination thereof, at temperature zones for the second through eighth cavities of the eight-cavity mold, and provided by strain gauge connector 86 to the hot runner controller 91. A strain profile 134 generated by the hot runner controller 91 from strain readings received through strain gauge connector 86 from a strain gauge 52, 100, or 83 or a combination thereof, is also provided for a first cavity of the eight-cavity mold. The strain profile 132 achieves a peak strain 135 at a time 136 occurring before target peak strain time 92. An algorithm of the controller 91 can identify the deviation of first cavity strain profile 134 from the target peak strain profile 93 and take corrective action, such as instructing thermocouple 79, 76, 79, and 82 via thermocouple connector 85 to adjust the heat produced in the temperature zone for the first cavity by heaters 72, 75, 78, and 81 respectively. As the temperature in the temperature zone for the first cavity changes, the deviation of the first cavity strain profile 134 from the target strain profile 93 is eliminated.

Figure 3:
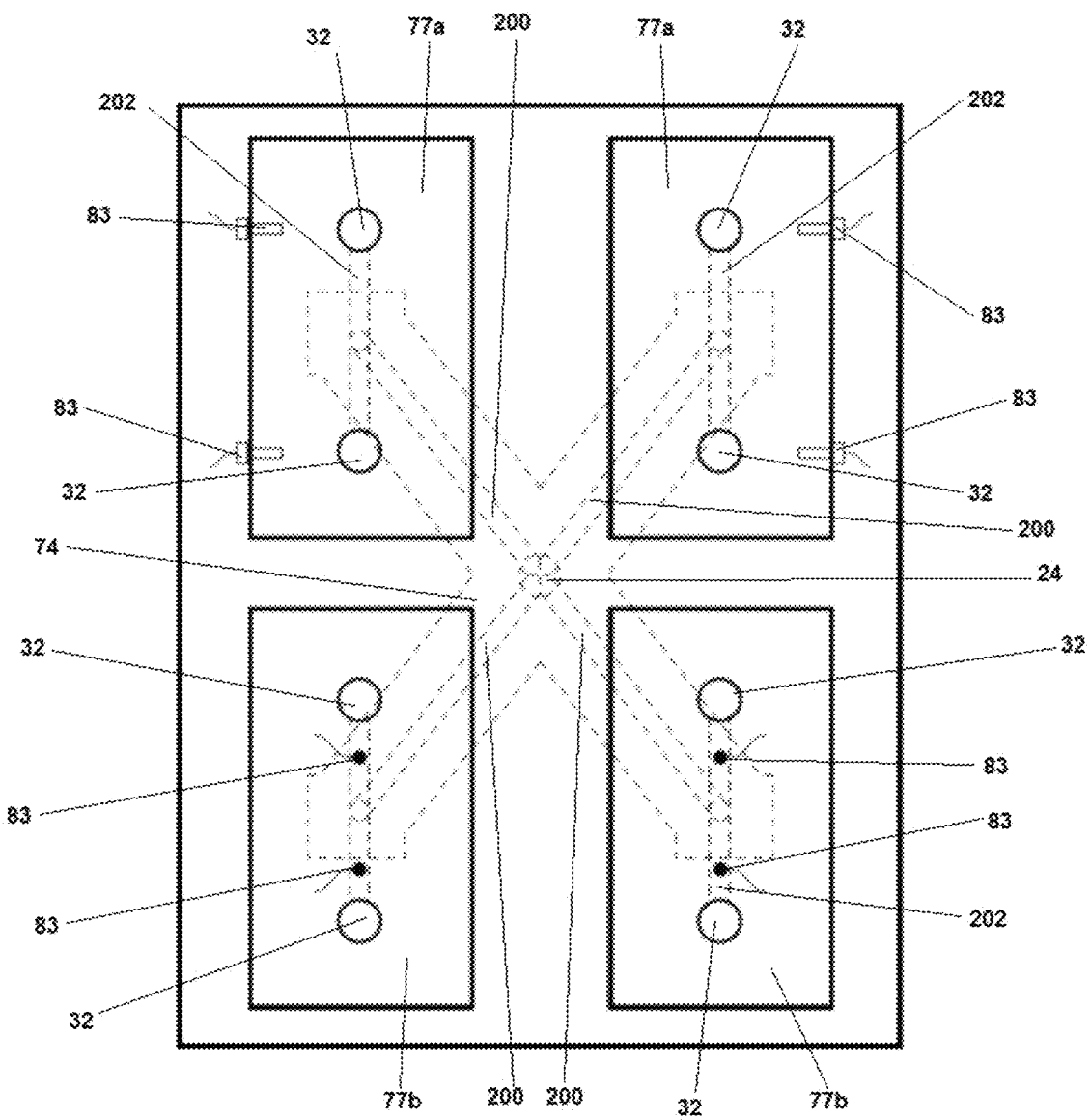
FIG. 3 illustrates a top view of four hot runner manifolds in an eight-cavity molding apparatus, each hot runner manifold leading to two molds and containing two strain pins.
Figure 4:
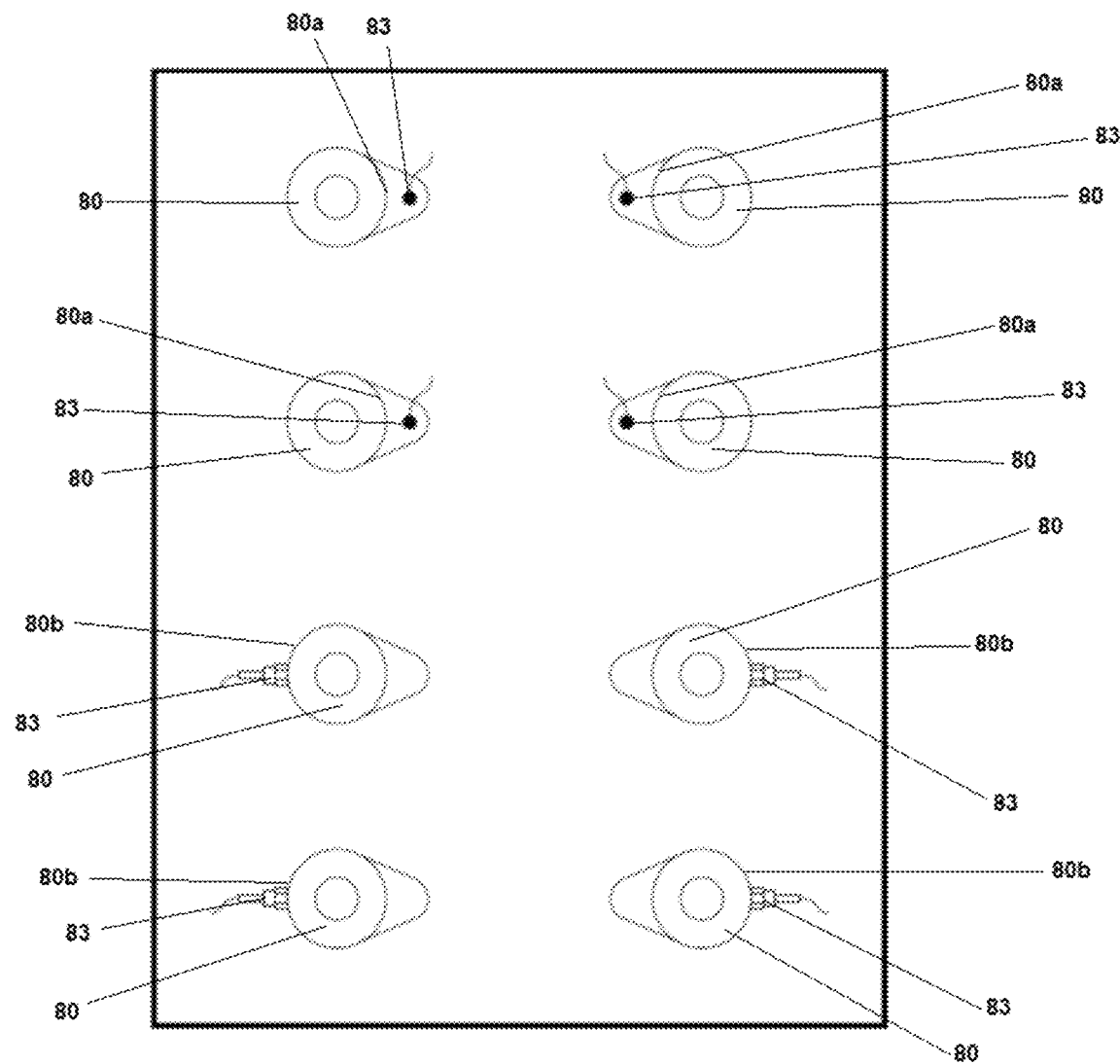
FIG. 4 illustrates a top view of the nozzles of an eight-cavity molding apparatus, each nozzle containing a strain pin.
Figure 5:
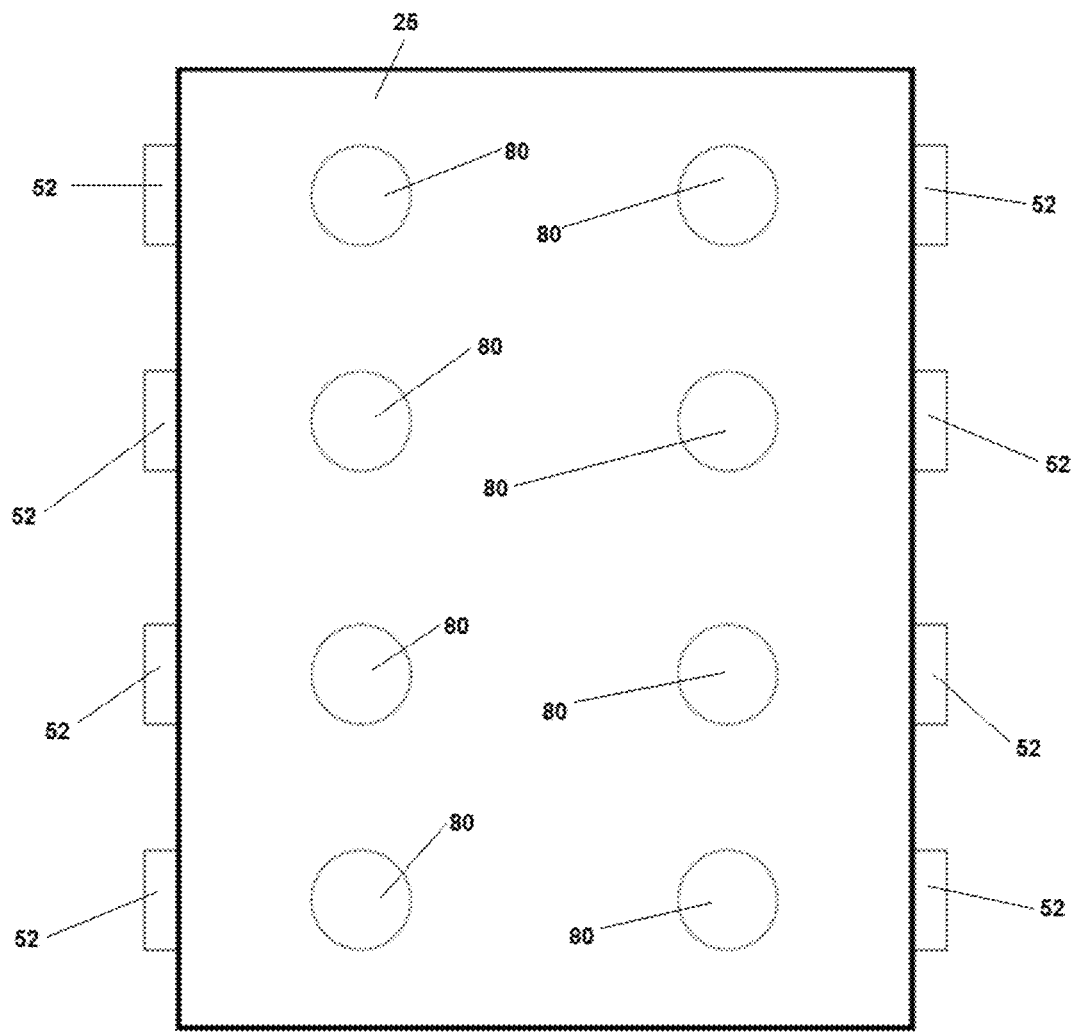
FIG. 5 illustrates a top view of an eight-cavity mold having eight strain gauges, one for each cavity, placed on the side of the mold.

FIGS. 3-5 depict possible locations to install the strain gauges 100, 83, and 52 respectively. FIG. 3 depicts four hot runner manifolds 77a, 77b, 77c, 77d, each hot runner manifold 77a-77d receiving molten thermoplastic material 24 from a primary melt flow conduit 200 and distributing molten thermoplastic material to a secondary melt flow conduit 202 that connects to two mold cavities 32. Each hot runner manifold 77a-77d includes two strain pins 100, such that a strain pin 100 is associated with each mold cavity 32. In hot runner manifold 77a, strain pins 100 are installed to the side of secondary melt flow conduit 201. In hot runner manifold 77b, strain pins 100 are installed above secondary melt flow conduit 202. In other embodiments within the scope of the disclosure, strain pins 100 may be installed below secondary melt flow conduit 202 or above, to the side, or below primary melt flow conduit 200. In some embodiments within the scope of the present disclosure, more than one strain pin 100 may be associated with each mold cavity 32. In other embodiments within the scope of the present disclosure, hot runner manifolds 77a-77d may include only one mold cavity 32 or may include more than 2 mold cavities 32. The number of conduits through which molten thermoplastic material 24 travels in order to reach the hot runner manifolds 77a-77d may vary, the number of conduits through which molten thermoplastic material 24 travels in the hot runner manifolds 77a-77d to reach mold cavities 32 may vary, and the number of hot runner manifolds in an injection molding apparatus 10 may vary.

FIG. 4 depicts eight hot runner nozzles 80, each hot runner nozzle 80 connected to a mold cavity 32 (not pictured). A strain gauge 83 is installed in each hot runner nozzle 80. In four hot runner nozzles 80, the strain gauge 83 is installed on a side 80a of the hot runner nozzle 80 that is closest to other hot runner nozzles 80. In the other four hot runner nozzles 80, the strain gauge 83 is installed on a side 80b of the hot runner nozzle 80 that is farther from the other hot runner nozzles 80. In some embodiments within the scope of the present disclosure, more than one strain pin may be associated with each hot runner nozzle 80.

FIG. 5 depicts hot runner nozzles 90 attached to a mold side 25, and eight strain gauges 52 are attached to the outside of the mold side 25. One mold cavity 32 (not pictured) is associated with each strain gauge 52. In some embodiments within the scope of the present disclosure, more than one strain pin may be associated with each mold cavity 32. Additionally, the strain gauges 52 may be placed on other surfaces of a mold 28 in other embodiments within the scope of the present disclosure.

Figure 6:
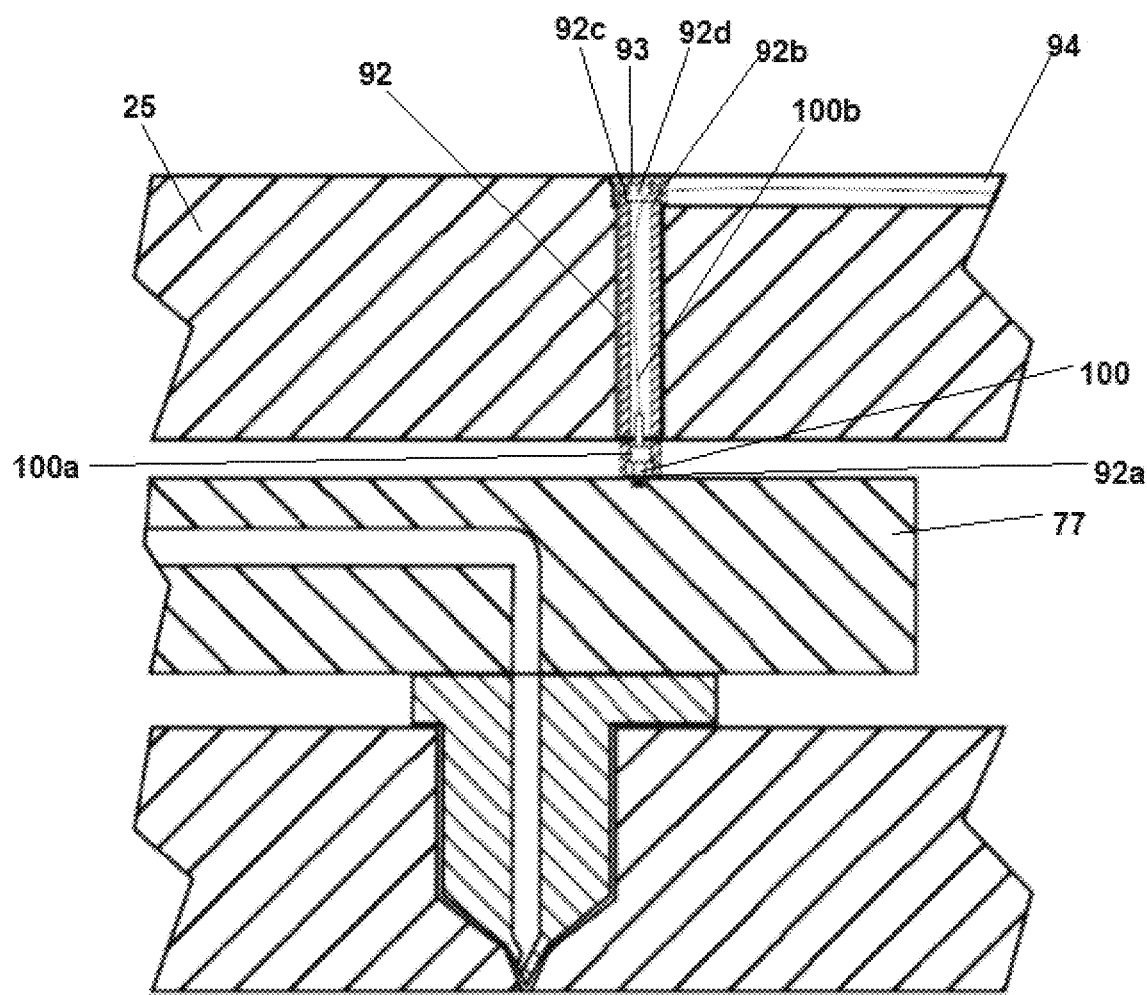
FIG. 6 illustrates a strain gauge installation tube used for installation or removal of a strain gauge in a hot runner manifold.

FIG. 6 exhibits a method to install a strain pin 100 in a hot runner manifold 77 using a hollow strain gauge installation tube 92. In some embodiments within the scope of the present disclosure, the male hex fitting 100a of the strain pin 100 is turned clockwise or counterclockwise with the female hex fitting 92a of the strain gauge installation tube 92 which is driven by using a wrench or socket to turn the strain gauge installation tube 92 clockwise or counterclockwise by a male hex fitting 92b or female hex fitting 92c at the top of the hollow strain gauge installation tube 92. In other embodiments within the scope of the present disclosure, the hollow strain gauge installation tube 92 will have other mechanisms or designs known in the art for connection with a wrench, socket, or other installation tool. The strain gauge installation tube 92 is hollow, which allows the strain pin wire 100b to be fed through the strain gauge installation tube 92, then through the slot 92d for the strain pin wire 100b and into the wire channel 94. After installation of the strain pin 100, a removable insulator 93 is fitted around the top of the strain gauge installation tube 92 to provide thermal isolation and keep the strain gauge installation tube 92 from moving. The removable insulator 93 may be made from a thermoset plastic material or a thermoplastic material with a continuous use temperature above 200° F.

Figure 7:
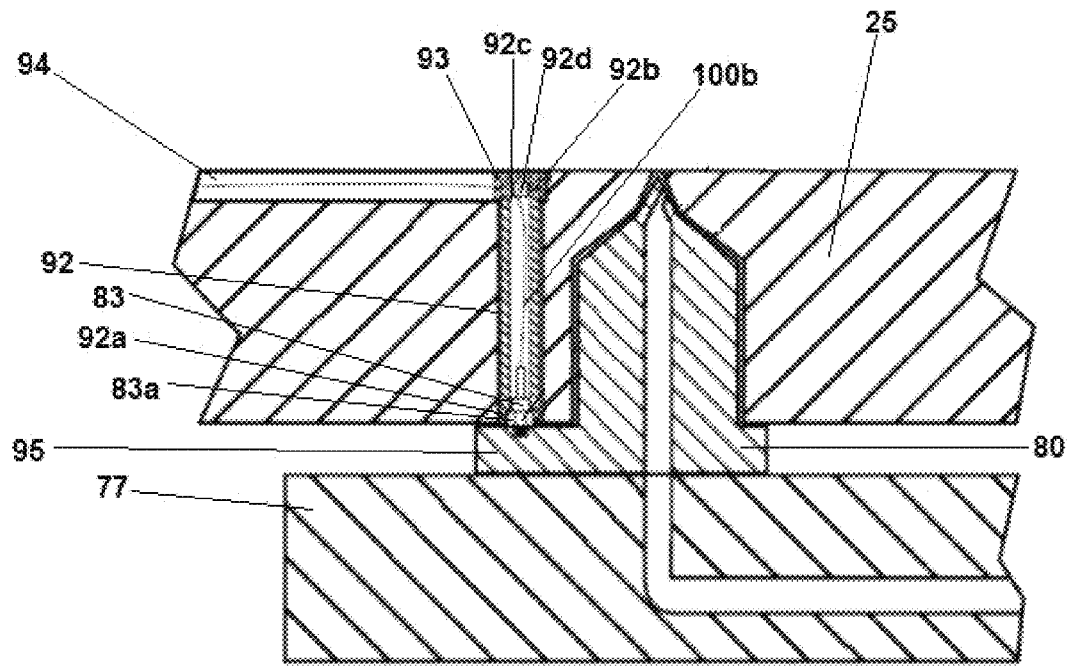
FIG. 7 illustrates a strain gauge installation tube used for installation or removal of a strain gauge in a hot runner nozzle.

FIG. 7 illustrates a nozzle 80 modified with an extension 95 so that a strain pin 83 can be installed in the same manner depicted in FIG. 6. The strain gauge installation tube 92 passes through mold side 25 to reach extension 95 of the nozzle 80. The removable insulator 93 is fitted around the top of the strain gauge installation tube 92 in the mold side 25, and the wire channel 94 is provided in the mold side 25. In other embodiments within the scope of the present disclosure, the strain gauge installation tube 92 may pass through mold side 27 or any other region of a mold 28, through hot runner manifold 77, or through any area suitable area of the injection molding apparatus 10.

Figure 8:
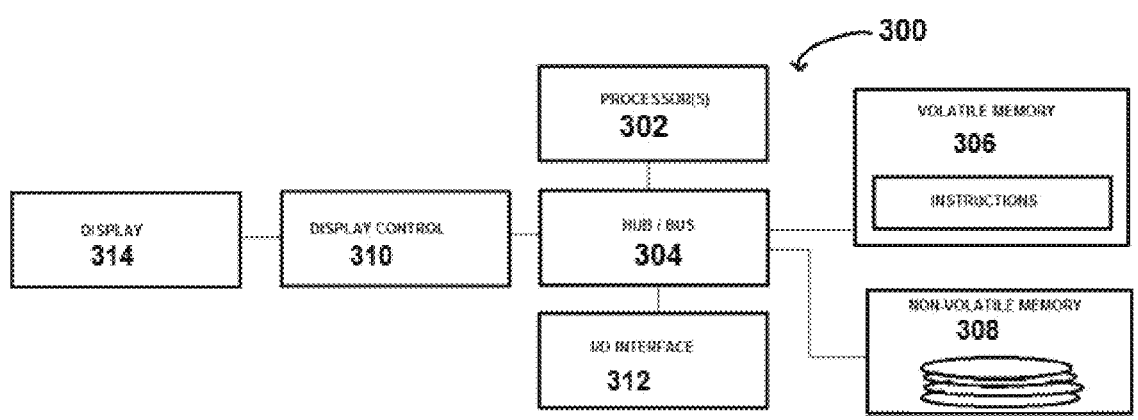
FIG. 8 is a schematic illustration of a hot runner controller for an injection molding system.

FIG. 8 illustrates a block diagram of an example hot runner controller 300 (such as hot runner controller 91) that may be utilized in an injection molding system. The virtual cavity sensor 300 may include, for example, one more central processing units (CPUs) or processors 302, and one or more busses or hubs 304 that connect the processor(s) 302 to other elements of the virtual cavity sensor 300, such as a volatile memory 306, a non-volatile memory 308, a display controller 310, and an I/O interface 312. The display controller 310 may be connected to a display 314. The volatile memory 306 and the non-volatile memory 308 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 306 and/or the memory 308 may store instructions 312 that are executable by the processor 302. For example, in a molding apparatus particularly configured to perform the techniques described herein, the instructions may be the instructions executed by the controller 300. In these embodiments, the instructions stored in the memories 306 and 308 may also include instructions to perform the actions described with respect to the controller.

The controller 300 is only one example of a controller suitable to be particularly configured for use in a molding apparatus. Other embodiments of the controller 300 may also be particularly configured for use in a molding apparatus, even if the other embodiments have additional, fewer, or alternative components than shown in FIG. 8, have one or more combined components, or have a different configuration or arrangement of the components. Moreover, the various components shown in FIG. 8 can be implemented in hardware, a processor executing software instructions, or a combination of both hardware and a processor executing software instructions, including one or more signal processing and/or application specific integrated circuits.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of evenly distributing molten thermoplastic material to multiple cavities using a hot runner system in a molding apparatus comprising:
   creating, by one or more processors, a target strain profile for a molding process of a molding apparatus;
   receiving, by the one or more processors, strain readings reflecting changes in strain during a molding process as an output from at least one strain gauge in each of a plurality of temperature zones of the molding apparatus,
   monitoring, by the one or more processors, the strain readings for each temperature zone in order to detect a deviation from the target strain profile by a temperature zone;
   if a deviation is detected, determining, by the one or more processors, whether the deviation exceeds a deviation limit;
   if the deviation exceeds a deviation limit, adjusting heat produced by one or more heaters in the deviating temperature zone in order to correct the deviation,
   and amplifying the changes in strain sensed by at least one of the at least one strain gauge in each of the plurality of temperature zones using an alternative material insert filling an aperture in which the at least one of the at least one strain gauge in each of the plurality of temperature zones is located.

2. The method of claim 1, wherein the target strain profile is based on a median or an average of the strain readings provided by the plurality of temperature zones.

3. The method of claim 1, wherein the target strain profile is predetermined.

4. The method of claim 1, wherein at least one of the at least one strain gauge in each of the plurality of temperature zones is located at least one of:
   in a portion of a hot runner manifold, on an outer surface of a mold, and in a hot runner nozzle.

5. A method of installing a strain gauge in an injection molding system comprising:
   connecting a hollow strain gauge installation tube to a strain gauge that has been placed in an aperture;
   feeding a wire of the strain gauge through the hollow interior of the hollow strain gauge installation tube and into a wire channel;
   turning the hollow strain gauge installation tube until the strain gauge is tightly secured within the aperture;
   fitting a removable insulator around the top of the strain gauge installation tube; and
   filling the aperture with an alternative material insert made from a material that amplifies the strain experienced by the strain gauge.

6. The method of claim 5, wherein the aperture is located in an extension of a hot runner nozzle.

7. The method of claim 5, and inserting the hollow strain gauge installation tube through a side of a mold.

* * * * *